United States Patent [19]
Blase

[11] Patent Number: 6,119,836
[45] Date of Patent: Sep. 19, 2000

[54] DUCT AN ENERGY-FEED CHAIN

[75] Inventor: Günter Blase, Bergisch Gladbach, Germany

[73] Assignee: Igus Spritzgussteile für die Industrie GmbH, Köln, Germany

[21] Appl. No.: 08/930,450

[22] PCT Filed: Apr. 3, 1996

[86] PCT No.: PCT/DE96/00586

§ 371 Date: Nov. 18, 1997

§ 102(e) Date: Nov. 18, 1997

[87] PCT Pub. No.: WO96/31710

PCT Pub. Date: Oct. 10, 1996

[30] Foreign Application Priority Data

Apr. 3, 1995 [DE] Germany .......................... 195 12 086
Apr. 3, 1995 [DE] Germany .......................... 195 12 105

[51] Int. Cl.[7] .................................................. H02G 11/00
[52] U.S. Cl. .................... 191/12 C; 191/1 R; 191/12 R; 191/23 R; 104/140
[58] Field of Search .................. 191/1 R, 12 R, 191/12 C, 23 R, 23 A, 21; 104/139, 140, 141, 142, 144, 145, 172.2, 172.3

[56] References Cited

U.S. PATENT DOCUMENTS 3,779,003  12/1973  Boissevain et al. .
4,690,065   9/1987  Belanger et al. .................. 104/172.3
5,178,247   1/1993  Vagaggini .
5,649,415   7/1997  Pea .................................. 191/12 C Primary Examiner—S. Joseph Morano
Assistant Examiner—Robert J. McCarry, Jr.
Attorney, Agent, or Firm—Browdy and Neimark

[57] ABSTRACT

The invention relates to a guide channel with long, parallel side elements, between which an energy transmission chain can be laid in the longitudinal direction, where the guide channel is composed of several side elements arranged with their face ends next to one another in the longitudinal direction of the channel. In order to create a guide channel which is of low weight, has a visual appearance and shape which permits versatile use, emits little noise and at the same time possesses great stability, it is proposed in accordance with the invention that side elements (1) display dimensionally stable hollow sections and connecting elements (2) be provided between the opposite face ends of side elements (1), by means of which the side elements can be fastened to each other and to a substructure. (FIG. 1)

18 Claims, 5 Drawing Sheets

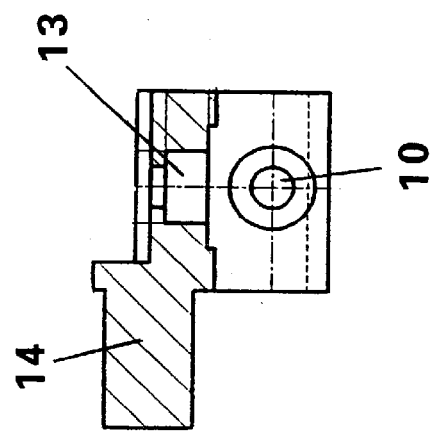
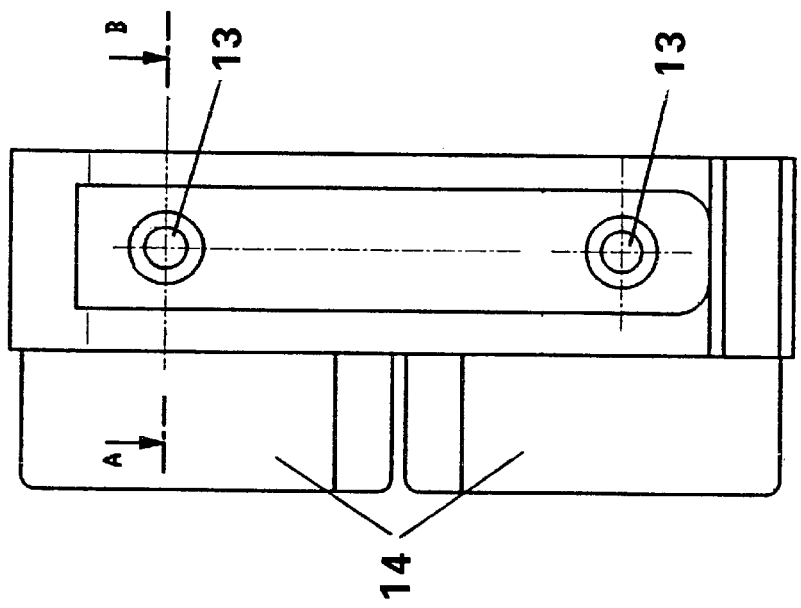
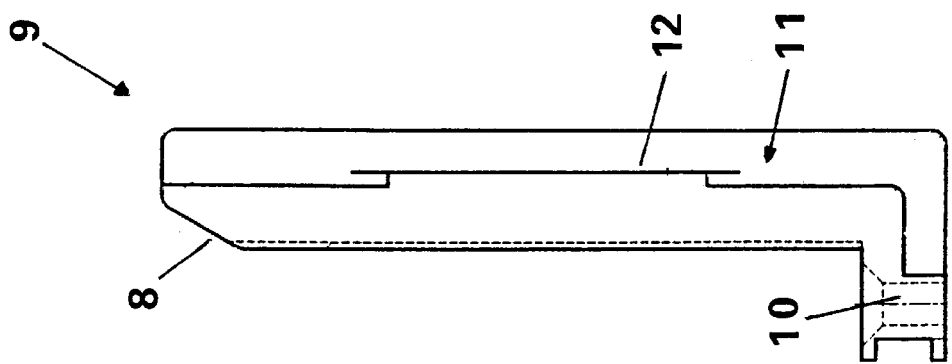
FIG. 3C
FIG. 3B
FIG. 3A

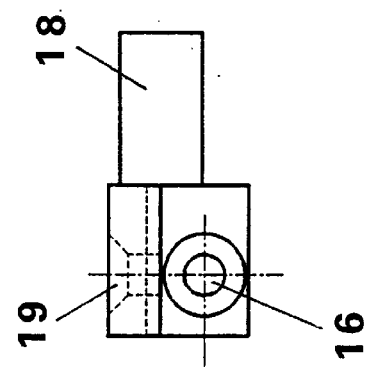
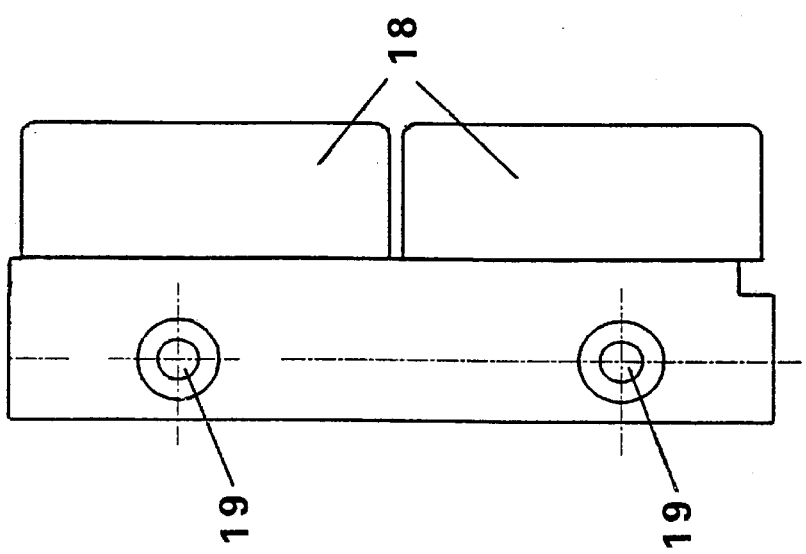
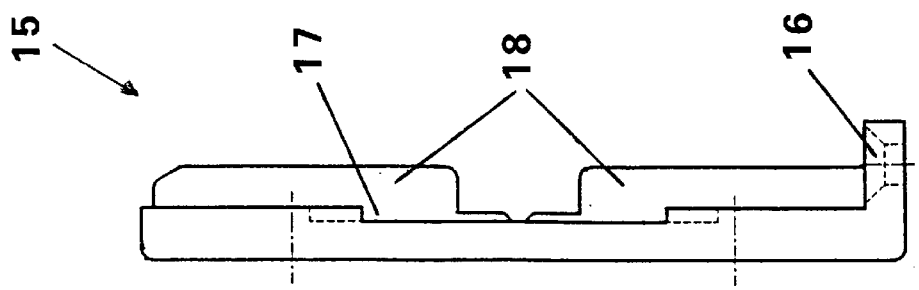

DUCT AN ENERGY-FEED CHAIN

BACKGROUND OF THE INVENTION

1. Technical Field of the Invention

The invention relates to a guide channel for energy transmission chains with long, parallel side elements, between which an energy transmission chain can be laid in the longitudinal direction, where the guide channel is composed of several side elements arranged with their face ends next to one another in the longitudinal direction of the channel.

2. Prior Art

Guide channels of this kind are used to guide energy transmission chains which are used to accommodate flexible supply lines for electricity, gases, fluids or the like and lead these to a moveable consumer. They are particularly used where the energy transmission chains have long travel paths, e.g. in plant construction, materials handling, etc., but are not restricted to such applications.

During the travel motion of the moveable consumer, the energy transmission chains, which are flexible in at least one direction, are laid down or picked up in or from the guide channels by an unrolling and rerolling motion. In this context, when travelling over long paths in a rerolling motion of the energy transmission chain, the upper section of the same, known as the upper strand, moves in sliding fashion on the lower section of the energy transmission chain, known as the lower strand, lying in the guide channel. If the connecting elements of the energy transmission chain are mounted in the middle of the travel path on the guide channel, the upper strand slides on the lower strand over one half of the travel path of the energy transmission chain. In order to ensure simple traversing of the energy transmission chain over the other half of the travel path as well, the guide channels are mostly provided with sliding rails located on the side walls of the guide channels, so that the upper strand can be moved on the sliding rails.

Hitherto known guide channels for energy transmission chains are mostly arranged on a substructure in non-slip fashion by means of fastening elements, where fastening of the side elements arranged parallel to one another on the substructure is accomplished using angle brackets, each of which is fastened by means of one bolted connection on the side elements with abutting face ends and one bolted connection on the substructure. The substructure used often consists of C-shaped sections arranged transversely to the longitudinal direction of the guide channels, where the lock nut for securing the angle brackets is located in the C-shaped sections in longitudinally moveable fashion to allow infinitely variable gaps to be set between the side elements of the guide channels. Furthermore, there are also guide channels designed in the form of U-shaped sections.

The guide channels known to date are mostly made of sheet steel with a thickness of approx. 2 mm, which may also be profiled in order to increase the rigidity. To fasten the sliding rails, the side walls and the sliding rails are provided with throug-hholes, so that the sliding rails can be fastened to the side walls of the guide channels by means of bolted connections.

The disadvantages of guide channels of this kind are their relatively high weight and the outward-projecting, occasionally sharp-edged areas of the angle brackets of the bolted connections used for fastening the sliding rails, or folded areas of the side walls serving, inter alia, to reinforce the guide channels. In addition, rapid travel motion of the consumer supplied by means of the energy transmission chain entails severe noise generation, owing to the rapid laying of the energy transmission chain onto the guide channel. Consequently, the field of application of the guide channels is on the whole restricted to relatively rough designs in the plant construction sector.

Furthermore, a generic guide channel is known from DE 41 40 910 C1, where the side elements consist of thin metal facing sheets with a plastic core or corrugated profile between. The side elements are secured on a supporting section by means of wedges. In this context, the clamping effect is increased owing to the elastic design of the side elements, the result being that the side elements are elastically deformed upon being fastened to the supporting section. Thus, the side walls display only little inherent rigidity. The laterally protruding wedges can unintentionally be loosened if exposed to external forces and, together with the laterally projecting substructure, form a host of projections which may have a disturbing effect and prevent the guide channel being designed with an essentially smooth outer surface.

OBJECT AND SUMMARY OF THE INVENTION

Consequently, the task of the present invention is to create guide channels which are of low weight, have a visual appearance and shape which permits versatile use, emit less noise during travel motion of the energy transmission chain and possess great stability.

In accordance with the invention, this task is solved in that the side elements display dimensionally stable hollow sections and that connecting elements are provided between the opposite face ends of the side elements, by means of which the side elements can be fastened to one another and to a substructure. As a result, the necessary fastening elements for connecting the side elements to each other and/or elements for fastening other items, such as sliding rails and the like, can easily be arranged within the cross-section of the hollow sections, thus completely avoiding outward-facing projections. Furthermore, this permits the creation of essentially smooth outer and inner surfaces of the guide channel and, consequently, a pleasing visual appearance, as well as the avoidance of disturbing projections. All in all, the field of application of guide channels can thus be expanded. In this context, it is advantageous, but not absolutely essential, for the hollow sections to extend over the entire length of the side elements, and the guide channels may also have a U-shaped profile or be designed in one piece. Designing the side elements as hollow sections makes it possible to achieve substantial weight savings while obtaining side walls with great rigidity and a comparatively small space requirement. A marked reduction in noise levels during travel motion of the energy transmission chains is achieved at the same time. Assembly is greatly simplified by the fact that the side elements can be simultaneously fastened both to one another and to a substructure by means of the connecting elements. In this context, the connecting elements can be designed in shoe form or as tongue-and-groove joints, for example. They can also be integrally moulded on the face ends of the side elements in one piece, or fastened to these by means of positive and/or non-positive elements.

The side elements preferably display a profile, extending uniformly over the entire length of the side elements, this allowing the connecting elements to be fastened to the face end of the side element after cutting it off to any desired length. This permits particularly simple adaptation of the length of the guide channel, at the same time allowing the side elements to be manufactured in long lengths and thus inexpensively.

The hollow section preferably displays several chambers which, by preference, extend in the longitudinal direction of the side elements and can be formed by dimensionally stable struts connecting the inner and outer wall of the side elements. The struts also serve as reinforcement at the same time. The struts preferably run is an essentially horizontal direction. The chambers can also be open on one side, or have cutouts in the side, for instance at the too or facing the face ends of the side elements. However, the chambers are preferably designed to be closed when the guide channel is assembled. The struts can also be arranged perpendicular to the longitudinal direction of the side elements.

In a preferred embodiment, the side elements are aligned in relation to each other during fastening with the connecting elements, and the connecting elements are designed in such a way that the side elements can be fitted and removed singly. This permits simple assembly and disassembly of the guide channel and avoids the danger of lateral offset in the region of the abutting face ends of adjacent side elements, which can otherwise prove most disturbing during rapid motion of the energy transmission chain in the guide channel. Alignment of the side elements can, for example, be accomplished by sufficiently long grooves or projections on the side elements which engage corresponding projections or grooves on the connecting elements.

The connecting elements preferably display pegs which can be fitted precisely into cavities in the face ends of the side elements. This allows simple and stable fastening of the connecting elements to the side elements and, at the same time, alignment of the latter in relation to each other.

It is advantageous for the connecting elements to be of two-part design where, when the guide channel is assembled, each of the parts is fastened to a side element by means of pegs, for example, and, at the opposite end, displays areas which laterally overlap the other part and which can be fastened to each other by means of fastening elements. In this way, after releasing the fastening elements, the side elements can be removed from the guide channel by sliding the side elements in a direction transverse to the guide channel, meaning that the side elements can be assembled and/or disassembled without having to disassemble the whole length of the guide channel. This is particularly advantageous in the case of guide channels of great length. Furthermore, the overlapping areas of the connecting elements bring about alignment of the side elements in relation to each other, thereby substantially facilitating assembly of the side elements.

The side elements of the guide channel can have an L-shaped profile, the short leg pointing towards the interior of the channel and forming a support for the lower strand of the energy transmission chain. Furthermore, the top end of the profile of the side elements can have an area receding from the interior of the channel, so that the cross-section of the channel widens towards the top, facilitating insertion of the energy transmission chain for positioning of the same in the channel.

End caps are advantageously provided on the face ends of the side elements, so that the hollow chambers of the side elements are sealed off from the outside and the formation of dirt deposits in the hollow sections is prevented. Sealing off the hollow chambers achieves effective noise insulation. Furthermore, the end caps can serve to fasten the side elements on a supporting structure. For fastening to the side elements, the end caps can, in this content, be provided with pegs which can be fitted precisely into cavities on the face ends of the side elements.

The overlapping areas of the connecting elements and/or the end caps can be designed with an L-shaped cross-section, the short legs pointing towards the interior of the channel and being provided with fastening elements for fastening the channel to a supporting structure. The side elements are thus fastened to the supporting structure by means of the connecting elements and/or the end caps. The L-shaped design of the connecting elements enables simple assembly of the side elements, while increasing the stability of the connection at the same time.

If the overlapping areas of the connecting elements and/or the end caps lie flush with the contour of the outer walls of the side elements, the guide channel requires only little space, and any objects moving outside the guide channel cannot act on any outward-pointing projections on the guide channel.

The connecting elements and the end caps can be made of plastic.

Designing the side elements as extruded aluminium components permits low-cost manufacture of the hollow sections, together with great stability and maximum weight savings. However, the hollow sections can also be made of plastic, particularly glass fibre-reinforced plastic, and also of other materials.

Sound-insulating material can be provided in the cavities of the side elements. In particular, the cavities can be filled with foam plastics.

For fastening sliding rails on the inner wall of the side elements, the walls of the side elements facing the channel can display recesses in which lateral projections of the sliding rails can be fastened, preferably without any other fastening elements, this permitting simple handling of the sliding rails. In particular, this means that the inner side of the guide channel can also be designed to be even and free of projections. The projections of the sliding rails can, for example, be designed as snap-in cams, or also as separate studs, where the lock nuts and the like can be recessed into the side walls. However, the sliding rails can also be fastened by means of other positive or non-positive fastening elements.

It is advantageous for the recesses in the side walls to be designed in the form of indentations so as to avoid through-holes and achieve a high degree of sound insulation. If the side elements are designed as hollow sections, this ensures that the hollow chambers are completely closed, thereby guaranteeing good stability and sound insulation of the guide channel. The indentations can also serve for face-end fastening of the connecting elements.

If the indentations extend along the entire length of the side elements, the side elements of the guide channels can be manufactured by a continuous shaping process, such as the extrusion process. Furthermore, the positioning of the sliding rails is not restricted by through-holes provided only at certain points, meaning that the sliding rails can be moved along in the guide channel as desired and simple adaptation to varying situations is possible. If necessary, the sliding rails can be fixed in position by means of sliding stoppers.

It is advantageous for the recesses provided in the side walls to have undercut areas into which the sliding rails can be hung by means of hook-like projections. This permits simple and rapid assembly and disassembly of the sliding rails.

It is advantageous for the side elements to have several recesses at different levels for fastening the sliding rails. If energy chains with chain links of different heights are used, the sliding rails can always be positioned in the guide channel at a level suited to the respective energy chain, and the guide channel can easily be converted in the event of a change of energy chain. In this context, sliding rails located in indentations on one level can cover indentations provided at other levels, thus avoiding material deposits in these indentations.

BRIEF DESCRIPTION OF THE DRAWINGS

An example of the invention is illustrated in the drawings and described in more detail below on the basis of the drawings. The drawings show the following:

FIGS. 3A, B and C respectively show a front view, side view and top view of a first part of a connecting element, FIGS. 4A, B and C respectively show a front view, side view and top view of a second part of a connecting element, FIGS. 5A, B and C respectively show a front view, side view and top view of an end cap.

DETAILED DESCRIPTION OF THE PREFERRED EMBODIMENTS OF THE INVENTION

Figure 1:
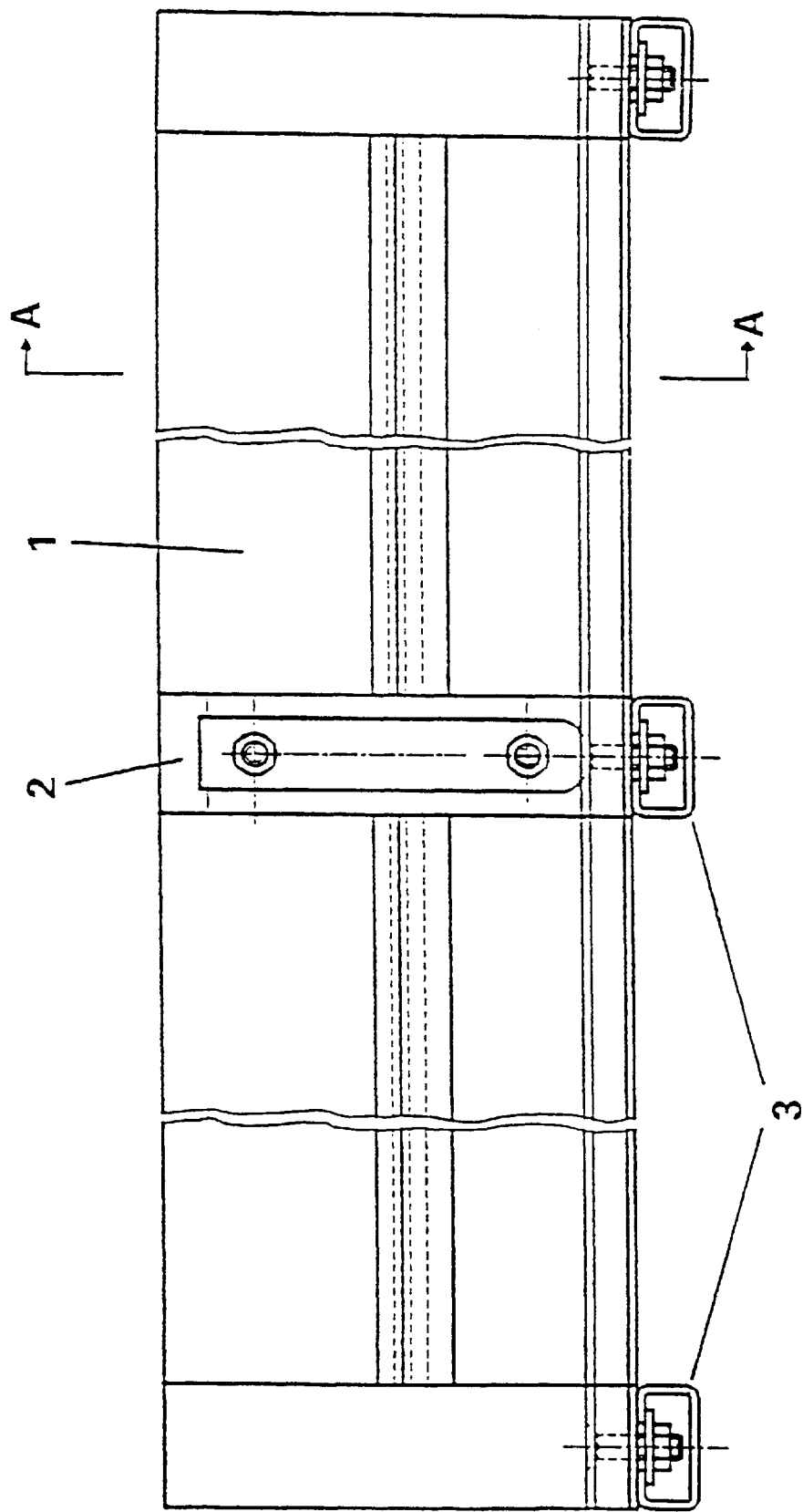
FIG. 1 A side view of a guide channel.
Figure 2:
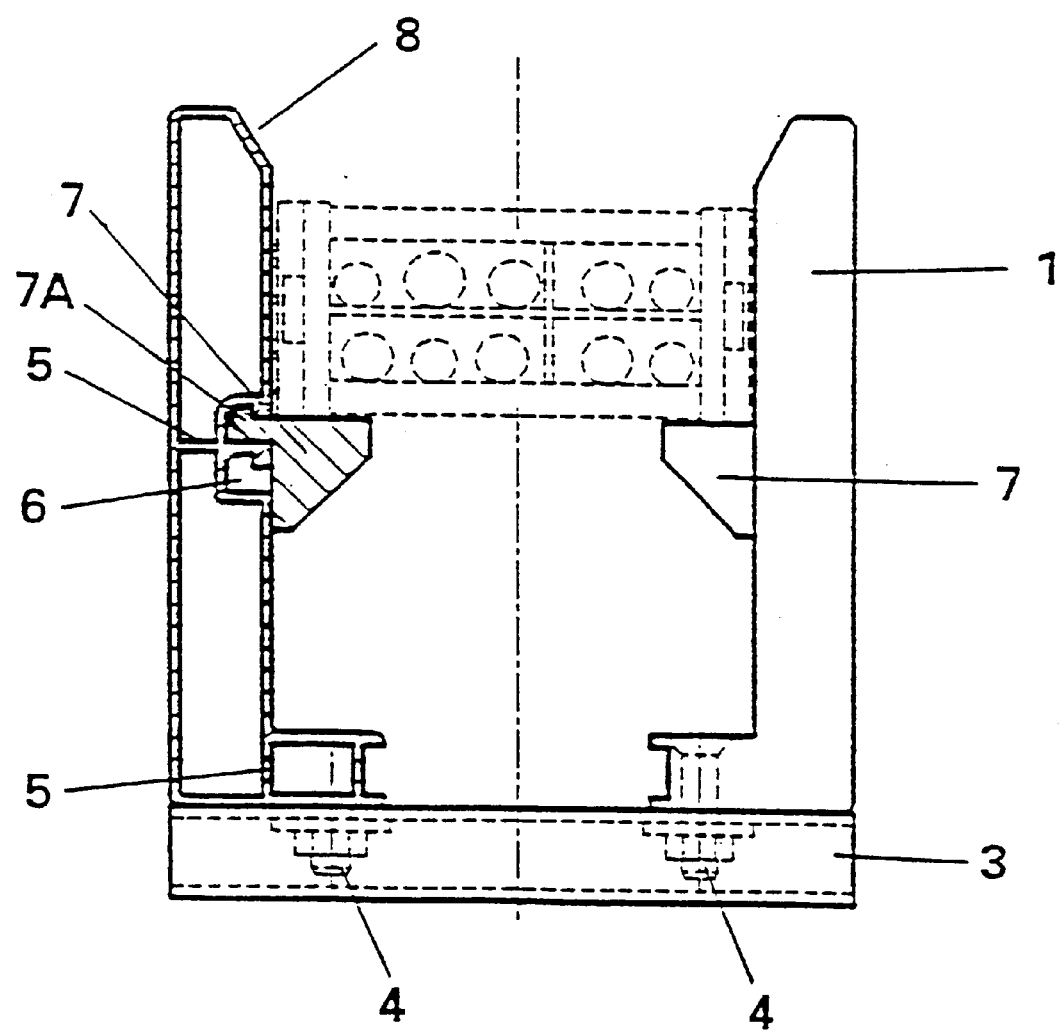
FIG. 2 The guide channel as per FIG. 1 along section A—A.

FIGS. 1 and 2 show a segment of a guide channel for energy transmission chains which displays side elements 1, arranged in a longitudinal row, which are located on a substructure 3 by means of connecting elements 2. The substructure consists of C-shaped sections which run transverse to the longitudinal direction of the guide channel and in whose longitudinal slits threaded bolts 4, acting on connecting elements 2, can be slid in a longitudinal direction, meaning that the side elements 1 can be retained at an infinitely variable distance from each other.

Side elements 1 are designed as L-shaped hollow sections and are subdivided into several hollow chambers by struts 5 extending in the longitudinal direction of side elements 1. The short leg of side elements 1 is arranged in contact with substructure 3 and serves as a support for the lower strand of the energy transmission chain. (The upper strand of the energy transmission chain is indicated by a dotted line in FIG. 2.) The inner walls of side elements 1 display indentations 6, provided with undercuts, in which sliding rails 7 are fastened as a support for the upper strand. In this context, several indentations 6, extending over the entire length of side elements 1, are arranged at intervals from each other, meaning that sliding rails 7 can be hooked in at different distances from the short legs of side elements 1. Struts 5 are arranged at the level of indentations 6, so that the hollow section is stabilised in the region of its narrowest cross-section.

The upper ends of side elements 1 display areas 8 receding from the guide channel, so that the interior cross-section of the guide channel widens towards the top, facilitating insertion of the energy transmission chain for positioning of the same in the channel.

Side elements 1 of the guide channel display a plane outer wall which ends flush with substructure 3. Furthermore, the fastening elements used to fasten the different parts of connecting elements 2 together also end flush with the outer wall of side elements 1. Consequently, the guide channel has no outward-facing projections, thus also requiring a minimum amount of space. The noticeable sound insulation in comparison with conventional guide channels already achieved by designing side elements 1 as hollow sections is substantially improved by filling the hollow sections with foamed plastic. Furthermore, the guide channel can, of course, also be designed as a continuous U-shaped section or be fitted with cover plates between the short legs of side elements 1 to close off the guide channel towards the bottom.

Side elements 1 are designed as extruded aluminium components in order to achieve maximum stability with low weight and low manufacturing costs.

Connecting elements 2, which connect the adjacent face ends of side elements 1, are of two-part design, as illustrated in FIGS. 3 and 4.

As can be seen from FIG. 3A, the front view of the first part 9 of connecting element 2 has an essentially L-shaped form. The contour of the front view of part 9 is adapted to the inner and outer contours of side element 1 in this context.

As shown in FIG. 3B, the side view and FIG. 3C, the top view, the first part 9 of connecting element 2 is provided with pegs 14 which can be fitted precisely into corresponding cavities in the respective side element 1, as a result of which part 9 of connecting element 2 can be fastened to a side element 1.

The short leg of the first part 9 of connecting element 2 is provided with a through-hole 10, in which a bolt or another kind of fastening element can be recessed and fastened to substructure 3.

The first part 9 of connecting element 2 displays an L-shaped area 11, receding from the outer side, meaning that the L-shaped body of the second part 15 of the connecting element, illustrated in FIG. 4, can be made to overlap with receding area 11. Receding area 11 displays a web 12, projecting towards the outside, which can be fitted precisely into a corresponding recess 17 of the second part 15 of connecting element 2. The illustrated shape of the area of the first part 9 of the connecting element which overlaps the second part 15 of the same guarantees a stable arrangement of the parts of the connecting element in relation to each other. As shown in the side view of the first part 9 of connecting element 2, see FIG. 3B, part 9 is provided with two through-holes 13, which can be aligned with corresponding through-holes 19 of the second part 15 of connecting element 2, meaning that the overlapping areas of the first and second parts of connecting element 2 can be fastened together by means of bolted connections or similar. Of course, parts 9 and 15 can also be fastened by means of snap-in cams or the like.

The second part 15 of connecting element 2 illustrated in FIG. 4 also displays an L-shaped profile, and its body can be adapted to receding area 11 of the first part 9 of connecting element 2, meaning that the first part 9 and the second part 15 of connecting element 2 (inner and outer side) display the same contour. At the same time, this contour also corresponds to that of side elements 1. Matching the corresponding first part 9, the short leg of the second part 15 of connecting element 2 displays a through-hole 16, which can accommodate a recessed fastening element acting in conjunction with substructure 3, through-hole 16 being arranged at a distance from through-hole 10 of the first part 9 transverse to the longitudinal direction of the guide channel. Furthermore, the second part 15 displays a recess 17, into which web 12 of the first part 9 can be fitted precisely, and also two pegs 18 on one of the lateral surfaces, which can be fitted precisely into corresponding cavities of a side element 1 for fastening the second part 15.

After releasing the fastening elements located in through-holes 10 and 16, side elements 1, located on the first part 9 of connecting element 2, can be slid towards the interior of the guide channel, meaning that the fastening element located in through-holes 16 of the second part 15 are exposed and can subsequently be removed in order to disassemble the corresponding side element 1. Of course, through-holes 10 and 16 of the parts of connecting element 2 can also be positioned at intervals in the longitudinal direction of the guide channel, although this results in a greater length of connecting element 2 in the longitudinal direction of the guide channel.

Side elements 1 can thus be removed from the guide channel by being slid transversely to the longitudinal direction of the guide channel, meaning that they can be disassembled without having to change the position of the adjacent side elements 1.

Owing to the fact that the elements for fastening side elements 1 to substructure 3 are located on the short leg of connecting elements 2, facing the interior of the guide channel, fastening elements projecting beyond the outer wall of side elements 1 can be dispensed with, meaning that the width of substructure 3 can be adapted to that of the guide channel.

Figure 5A:
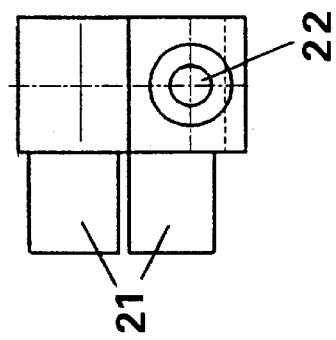
Figure 5B:
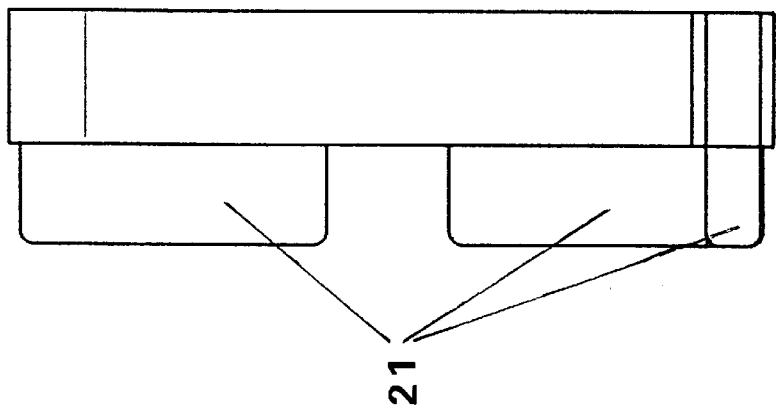
Figure 5C:
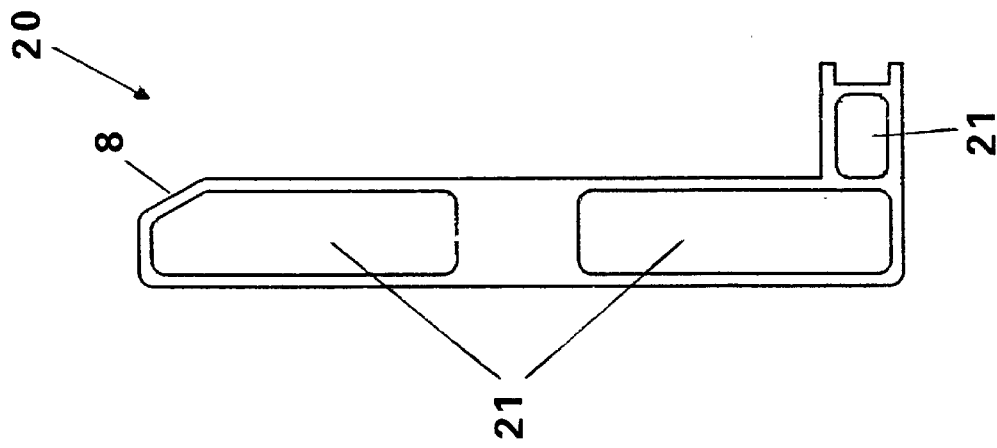

The contour of end caps 20, illustrated in FIG. 5, is likewise adapted to that of side elements 1, one of their face ends being provided with three pegs 21 (see FIG. 5A), which can be fitted precisely into corresponding cavities of side elements 1. Furthermore, the short leg of the L-shaped end caps 20 is provided with a through-hole 22, into which fastening elements can be inserted and fastened to substructure 3. Thus, the ends of side elements 1 facing away from the guide channel can be fastened via end caps 20.

In the practical example presented, the parts of connecting element 2, and also end caps 20, are made of plastic.

Sliding rails 7 (see FIG. 2) display an essentially trapezoidal cross-section, the longer lateral surface of which serves as the contact area for positioning against side element 1. Located at the upper end of the contact area and ending flush with the top edge, is a hook-shaped projection 7a with a short web which extends over the entire length of sliding rail 7 and hooks into indentation 6. Sliding rail 7 can be fastened to the side element by inserting hook-shaped projection 7a and is easily detached again. The height of the lateral contact area is dimensioned in such a way that, when sliding rails 7 is hooked in above the lowest indentation 6, the bottom edge of the contact area lies against an undercut or against side element 1. Owing to the provision of indentations 6, extending in the longitudinal direction of side elements 1, sliding rails 7 can be displaced longitudinally in indentations 6 and thus positioned at any desired point in these, and side elements 1 can be manufactured by a continuous shaping process.

LIST OF REFERENCE NUMBERS

1 Side element
2 Connecting element
3 Substructure
4 Threaded bolt
5 Strut
6 Indentation
7 Sliding rail
7a Hook-shaped projection
8 Receding area
9 First part of the connecting element
10 Through-hole
11 Receding area
12 Web
13 Through-hole
14 Peg
15 Second part of the connecting element
16 Through-hole
17 Recess
18 Peg
19 Through-hole
20 End cap
21 Peg
22 Through-hole

What is claimed is:

1. Guide channel for energy transmission chains having long, parallel side elements, between which an energy transmission chain can be laid in a longitudinal direction, said guide channel comprising a plurality of side elements arranged with face ends engaged to one another in a longitudinal direction of the channel, wherein adjacent side elements have in the longitudinal direction dimensionally stable hollow sections and connecting elements between opposite face ends of the adjacent side elements by means of which the adjacent side elements are fastened to each other and to a sub-structure;

wherein outer sides of said connecting elements and said side elements are respectively located in common planes to eliminate projections from said channel.

2. Guide channel according to claim 1, wherein said side elements (1) can be aligned in relation to one another by means of said connecting elements (2), during fastening the connecting elements so as to permit the side elements (1) to be fitted and removed one at a time.

3. Guide channel according to claim 1, wherein the connecting elements (2) have pegs (14, 18) which can be fitted precisely into cavities provided in the face ends of side elements (1).

4. Guide channel according to claim 1, wherein the connecting elements (2) have two parts wherein each of the two parts (9, 15) can be fastened to a side element and have areas at an opposite end which overlap with that of the other part.

5. Guide channel according to claim 1, wherein the side elements (1) each have an L-shaped profile and a short leg pointing towards an interior of the channel which form a support for the lower strand of the energy transmission chain.

6. Guide channel according to claim 1, wherein end caps (20) are provided which can be fastened to the face ends of the side elements (1).

7. Guide channel according to claim 1, wherein overlapping areas of the connecting elements and the end caps are designed with an L-shaped cross-section, wherein short legs thereof point towards an interior of the channel, and have fastening elements for fastening the channel to a supporting structure.

8. Guide channel according to claim 1, wherein sliding rails (7) are located on an inside of said channel on said side elements (1), said side elements having recesses on walls facing an interior of the channel, in which laterally projecting parts of the sliding rails (7) can be fastened.

9. Guide channel according to claim 8, wherein the recesses located on the inner walls of side elements (1) display undercut areas, into which the sliding rails (7) can be hooked by means of hook-shaped projections (7a).

10. Guide channel for energy transmission chains having long, parallel side elements, between which an energy transmission chain can be laid in a longitudinal direction, said guide channel comprising a plurality of side elements arranged with face ends engaged to one another in a longitudinal direction of the channel, wherein adjacent side elements have in the longitudinal direction dimensionally stable hollow sections and connecting elements between opposite face ends of the adjacent side elements by means of which the adjacent side elements are fastened to each other and to a sub-structure wherein said hollow sections serve to decrease noise created by the energy transmission chain in said guide channel.

11. Guide channel according to claim 10, wherein said side elements (1) can be aligned in relation to one another by means of said connecting elements (2), during fastening the connecting elements so as to permit the side elements (1) to be fitted and removed one at a time.

12. Guide channel according to claim 10, wherein the connecting elements (2) have pegs (14, 18) which can be fitted precisely into cavities provided in the face ends of side elements (1).

13. Guide channel according to claim 10, wherein the connecting elements (2) have two parts wherein each of the two parts (9, 15) can be fastened to a side element and have areas at an opposite end which overlap with that of the other part.

14. Guide channel according to claim 10, wherein the side elements (1) each have an L-shaped profile and a short leg pointing towards an interior of the channel which form a support for the lower strand of the energy transmission chain.

15. Guide channel according to claim 10, wherein end caps (20) are provided which can be fastened to the face ends of the side elements (1).

16. Guide channel according to claim 10, wherein overlapping areas of the connecting elements and the end caps are designed with an L-shaped cross-section, wherein short legs thereof point towards an interior of the channel, and have fastening elements for fastening the channel to a supporting structure.

17. Guide channel according to claim 10, wherein sliding rails (7) are located on an inside of said channel on said side elements (1), said side elements having recesses on walls facing an interior of the channel, in which laterally projecting parts of the sliding rails (7) can be fastened.

18. Guide channel according to claim 17, wherein the recesses located on the inner walls of side elements (1) display undercut areas, into which the sliding rails (7) can be hooked by means of hook-shaped projections (7a).

* * * * *